(12) United States Patent
Sugama et al.

(10) Patent No.: US 9,417,392 B2
(45) Date of Patent: Aug. 16, 2016

(54) OPTICAL WAVEGUIDE COMPONENT, MANUFACTURING METHOD THEREFOR, AND OPTICAL WAVEGUIDE DEVICE

(71) Applicant: FUJITSU LIMITED, Kawasaki-shi, Kanagawa (JP)

(72) Inventors: Akio Sugama, Atsugi (JP); Shinya Sasaki, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 14/478,183

(22) Filed: Sep. 5, 2014

(65) Prior Publication Data
US 2015/0093070 A1 Apr. 2, 2015

(30) Foreign Application Priority Data
Oct. 2, 2013 (JP) .................................. 2013-207170

(51) Int. Cl.
| G02B 6/12 | (2006.01) |
| G02B 6/36 | (2006.01) |
| G02B 6/13 | (2006.01) |
| H01L 21/00 | (2006.01) |
| G02B 6/30 | (2006.01) |

(52) U.S. Cl.
CPC ............... *G02B 6/30* (2013.01); *G02B 6/3652* (2013.01); *G02B 6/3692* (2013.01); *G02B 2006/12061* (2013.01)

(58) Field of Classification Search
CPC .................. G02B 2006/12061; G02B 6/3692; G02B 6/3652; G02B 6/30
USPC .................................................... 385/14–24
See application file for complete search history.

(56) References Cited

U.S. PATENT DOCUMENTS

| 5,644,667 A * | 7/1997 | Tabuchi ............... G02B 6/1221 385/131 |
| 7,099,534 B2 * | 8/2006 | Kato .................. C07K 5/06095 385/129 |
| 8,095,016 B2 * | 1/2012 | Chida .................. G02B 6/4246 398/135 |
| 8,238,704 B2 * | 8/2012 | Ben Bakir ............ G02B 6/1228 216/24 |

(Continued)

FOREIGN PATENT DOCUMENTS

| CN | 100456528 C | 1/2009 |
| JP | H01-126608 | 5/1989 |
| JP | H08-313756 | 11/1996 |
| JP | 2004-151391 A1 | 5/2004 |

(Continued)

OTHER PUBLICATIONS

Office Action of corresponding Taiwanese Patent Application No. 103130771 dated Jul. 23, 2015, with translation of the relevant part of the Office Action.

*Primary Examiner* — Akm Enayet Ullah
(74) *Attorney, Agent, or Firm* — Kratz, Quintos & Hanson, LLP

(57) ABSTRACT

An optical waveguide component includes: an optical fiber mounting substrate provided with optical fiber alignment grooves having either, for alignment of optical fibers, V-grooves or inverted trapezoidal grooves in which inverted top sections of the V-grooves are truncated; an optical waveguide substrate in which optical waveguides are formed; a resin layer that is aligned and fixed in a state in which the optical fiber mounting substrate and the optical waveguide substrate are flush or have a predetermined amount of offset; and a transparent resin that is filled in a gap in which the optical fiber mounting substrate and the optical waveguide substrate face each other.

5 Claims, 11 Drawing Sheets

(56) References Cited

U.S. PATENT DOCUMENTS

| | | |
|---|---|---|
| 2003/0173709 A1 | 9/2003 | Iwaizono et al. |
| 2005/0117847 A1 | 6/2005 | Ono et al. |
| 2007/0189672 A1 | 8/2007 | Yamaguchi |
| 2011/0133063 A1 | 6/2011 | Ji et al. |
| 2015/0139589 A1* | 5/2015 | Sakai .................. G02B 6/3807 385/76 |

FOREIGN PATENT DOCUMENTS

| | | |
|---|---|---|
| JP | 2005-308918 A1 | 11/2005 |
| JP | 2006-119627 A1 | 5/2006 |
| JP | 2010-286734 A1 | 12/2010 |
| JP | 2011-247913 A1 | 12/2011 |
| TW | 200517690 A | 6/2005 |
| TW | 201144877 A1 | 12/2011 |

* cited by examiner

CUTTING LINE

OPTICAL WAVEGUIDE COMPONENT, MANUFACTURING METHOD THEREFOR, AND OPTICAL WAVEGUIDE DEVICE

CROSS-REFERENCE TO RELATED APPLICATION

This application is based upon and claims the benefit of priority of the prior Japanese Patent Application No. 2013-207170, filed on Oct. 2, 2013, the entire contents of which are incorporated herein by reference.

FIELD

The embodiment discussed herein is related to an optical waveguide component, a manufacturing method therefor, and an optical waveguide device, and, for example, is related to an optical waveguide component, a manufacturing method therefor, and an optical waveguide device used for information communication devices for which high-speed, high-capacity signal transmission is desired.

BACKGROUND

Optical signals are suitable for high-speed, high-capacity signal transmission and have already been implemented in long-distance trunk communication systems. Furthermore, due to the increase in the speed of signals also for information devices such as computers, optical signals have already been implemented among such devices, and the introduction of optical signals within devices and within boards is on the horizon.

Optical fibers are excellent in terms of performance and price as wiring members that connect separate locations. However, it is desirable for portions that process optical signals such as optical transceivers, optical couplers, optical splitters, and arrayed waveguide gratings (AWG) and so forth to be formed as optical waveguides.

In addition, silicon photonics is also recently being employed. This has the advantage in that it is possible to form the same functions in very small areas by using semiconductor manufacturing processes to finely process silicon. There are limited uses for individual optical waveguide components formed on such substrates, but by connecting with the aforementioned optical fibers it is possible for optical signals that are processed by optical waveguides to be transmitted to target locations.

Together with improvements in the functions and the degree of integration of such optical waveguide components, the number of connecting optical fibers has increased remarkably. Ordinarily, optical waveguides and optical fibers are connected by using components that are referred to as fiber arrays in which optical fibers are adhesively fixed in V-grooves that are formed at regular intervals (for example, see Japanese Laid-Open Patent Publication No. 2011-247913).

In order to connect an optical waveguide and an optical fiber with low loss, the positional relationship of these has to be precisely controlled. Positional precision of approximately 1 μm is desired in single mode, and even in multi-mode positional precision within several μm is desired. A fiber array in which optical fibers have been aligned has the merit of it being possible to connect a large number of optical fibers at the same time; however, in order to meet the target positional precision, precise alignment not only with regard to XYZ triaxial movement but in a total of six axes including the rotation of the axes is desired. In particular, precision in the directions of rotation becomes remarkably strict as the number of optical fibers aligned in the fiber array increases.

This kind of problem regarding alignment precision is widely known, and there have been a large number of proposals for achieving both positional precision and ease of optical fiber connection work by forming, in optical waveguide substrates, V-grooves for the alignment of optical fibers (for example, see Japanese Laid-Open Patent Publication No. 2006-119627, Japanese Laid-Open Patent Publication No. 08-313756, Japanese Laid-Open Patent Publication No. 2005-308918, Japanese Laid-Open Patent Publication No. 01-126608, and Japanese Laid-Open Patent Publication No. 2004-151391).

In order to form V-grooves, a single-crystal silicon substrate is used as the material for an optical waveguide substrate. By performing anisotropic etching on this single-crystal silicon substrate, it is possible to obtain V-grooves having a precise shape that is determined by the angles of the crystal planes. By then using photolithography techniques to specify the etching pattern, it is possible to form V-grooves having accurate dimensions proximate to the core of an optical waveguide.

However, a problem arises as to whether to form the optical waveguide or the V-grooves first. If the V-grooves are formed first, a core of several μm to several tens of μm is formed in the end section of very large grooves of 100 μm or more; however, it is difficult to form the core without there being any deformation in the shape.

Consequently, in order to avoid this kind of problem, a method has been proposed in which a core is formed in a state where preformed V-grooves are temporarily filled with a resin (for example, see Japanese Laid-Open Patent Publication No. 2006-119627). Alternatively, a method has been proposed in which a core is formed in a state where a lid is placed on preformed V-grooves (for example, see Japanese Laid-Open Patent Publication No. 08-313756).

However, the method in which these V-grooves are temporarily filled has the drawbacks that the method is labor intensive and the effect thereof is insufficient. For example, when resin filling is employed, complete smoothness is unlikely and the shape of the core becomes deformed. On the other hand, when covering with a lid, if the positional precision with which the lid is placed and the thickness of the lid and so forth are not controlled, there is a problem in that there is a high possibility of the shape of the core being deformed by the lid.

Contrastingly, a method has been proposed in which V-grooves are formed later (for example, see Japanese Laid-Open Patent Publication No. 2005-308918). However, boiling for a long period of time in a highly concentrated alkaline solution has to be carried out for the anisotropic etching of silicon, and there are not many optical waveguide materials that can withstand this process. Specifically, although there are silica ($SiO_2$)-type optical waveguides, even these become damaged if strong protective measures are not taken.

Furthermore, another drawback of employing anisotropic etching of silicon is that the wall surfaces of the optical waveguide core also become inclined, and it is not possible for the optical fibers to be brought into close proximity with the core. In order to avoid this problem, forming vertical grooves by separate processing (for example, see Japanese Laid-Open Patent Publication No. 01-126608), and forming optical fibers into a shape corresponding to the inclined surface (for example, see Japanese Laid-Open Patent Publication No. 2004-151391) have been proposed.

However, for the former proposal, two types of processing have to be used, and therefore the forming step takes time. On the other hand, the latter proposal has a problem in that as well as the tip-end processing of the optical fibers being difficult in itself, the optical fibers have to be arranged in the V-grooves with the rotational direction orientations thereof being aligned. As described above, the effect is considerable if V-grooves can be formed in an optical waveguide substrate; however, there has been a problem in that the forming is itself very difficult.

SUMMARY

According to an aspect of the embodiments, an apparatus includes an optical waveguide component includes: an optical fiber mounting substrate provided with optical fiber alignment grooves having either, for alignment of optical fibers, V-grooves or inverted trapezoidal grooves in which inverted top sections of the V-grooves are truncated; an optical waveguide substrate in which optical waveguides are formed; a resin layer that is aligned and fixed in a state in which the optical fiber mounting substrate and the optical waveguide substrate are flush or have a predetermined amount of offset; and a transparent resin that is filled in a gap in which the optical fiber mounting substrate and the optical waveguide substrate face each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
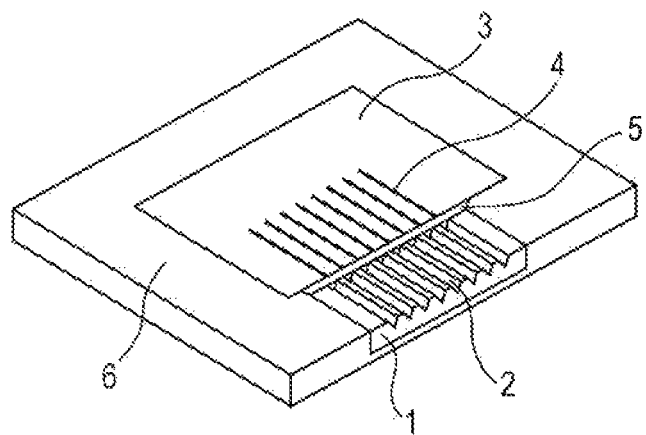
FIG. 1 is a schematic perspective view of an optical waveguide component of an embodiment of the present technology.
Figure 2:
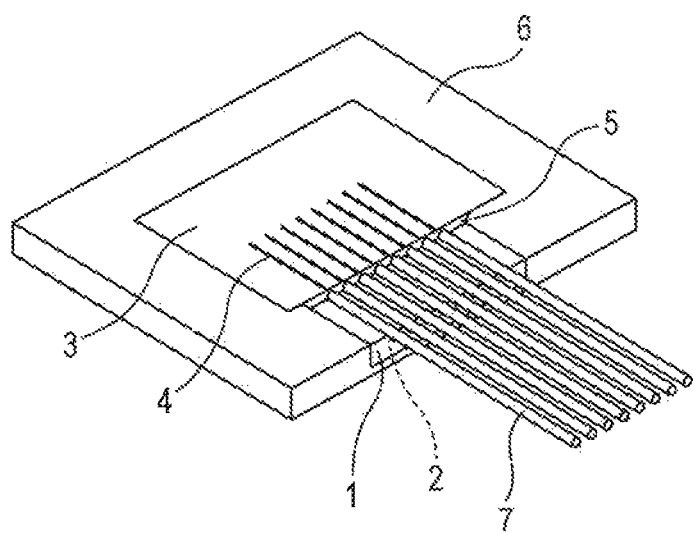
FIG. 2 is a schematic perspective view of an optical waveguide device in which optical fibers are aligned and fixed.

Hereinafter, an optical waveguide component and an optical waveguide device of an embodiment of the present technology are described with reference to FIG. 1 and FIG. 2. FIG. 1 is a schematic perspective view of an optical waveguide component of the embodiment of the present technology, and FIG. 2 is a schematic perspective view of an optical waveguide device in which optical fibers are aligned and fixed.

An optical fiber mounting substrate 1 in which optical fiber alignment grooves 2 are provided and an optical waveguide substrate 3 in which optical waveguides 4 are formed are aligned while being flush at the front surface side or having a predetermined amount of offset, and are fixed with a resin layer 6. Furthermore, a transparent resin 5 is filled in a gap in which the optical fiber mounting substrate 1 and the optical waveguide substrate 3 face each other.

In this way, because the optical fiber mounting substrate 1 and the optical waveguide substrate 3 are formed as separate substrates by separate steps, processing precision and the order of manufacturing steps do not pose problems. Furthermore, by fixing the optical fiber mounting substrate 1 and the optical waveguide substrate 3 with the resin layer 6 while being flush or having a predetermined amount of offset, as depicted in FIG. 2, the precision of the positional alignment of optical fibers 7 and the optical waveguides 4 increases.

In order to manufacture this kind of optical waveguide component, an optical fiber-mounting mother substrate that is provided with the optical fiber alignment grooves 2 and the optical waveguide substrate 3 that has the optical waveguides 4 formed therein are arranged so that the front surface sides thereof face downward in a state in which the optical fiber-mounting mother substrate and the optical waveguide substrate 3 face each other with a transparent resin 5 therebetween, and the front surface sides are affixed to an adhesive member while being flush or having a predetermined amount of offset. Next, the rear surface side is molded with the resin layer 6. Next, the optical fiber-mounting mother substrate and the optical waveguide substrate 3 may be separated from the adhesive member, and cut to a predetermined size in such a way that the surface of the optical fiber-mounting mother substrate on the opposite side to the surface that faces on the optical waveguide substrate 3 is exposed.

In this way, a flush state is achieved due to the affixing to the adhesive member, and subsequent rotational alignment may therefore be performed merely by in-plane rotation without three-dimensional multi-axial rotational control having to be performed, and the positional alignment precision therefore improves.

It ought to be noted that, in the step in which molding is performed with the resin layer 6, in order to ensure that the resin layer 6 does not enter into the optical fiber alignment grooves 2, the manufacturing process may be implemented in such a way that only the optical fiber alignment grooves 2 are filled with a filling resin in advance prior to the step in which the affixing to the adhesive member is carried out.

For example, the manufacturing process may be implemented in such a way that the front surface side of an optical fiber-mounting raw substrate provided with the optical fiber alignment grooves 2 is arranged so as to face downward and is affixed to the adhesive member, and the side sections thereof are covered by a filling resin in such a way that the rear surface is not covered and the optical fiber alignment grooves 2 are filled with the filling resin. The optical fiber-mounting mother substrate is formed when this optical fiber-mounting raw substrate is cut to a predetermined size in such a way that both end surfaces of the optical fiber alignment grooves are exposed. In addition, the optical fiber mounting substrate 1 is formed when, after molding has been performed with the resin layer 6, cutting is performed to a predetermined size in such a way that the surface of the optical fiber-mounting mother substrate on the opposite side to the surface that faces on the optical waveguide substrate 3 is exposed.

At such time, the front surface of the optical fiber-mounting mother substrate may be covered by a metal film with which the etching and removal of thin Al or the like that does not completely fill the optical fiber alignment grooves 2 is easy, and the thickness of this metal film constitutes the predetermined amount of offset.

Alternatively, the optical fiber alignment grooves 2 may have a shape that does not reach the end section of the surface of the optical fiber-mounting mother substrate on the opposite side to the surface that faces on the optical waveguide substrate 3, and cutting may be performed after the molding with the resin layer 6, in such a way that the cross sections of the optical fiber alignment grooves 2 appear.

It ought to be noted that although the optical fiber alignment grooves 2 are typically V-grooves, these may also be inverted trapezoidal grooves in which the inverted top sections of these V-grooves are truncated. In order to form these kinds of V-grooves or inverted trapezoidal grooves, it is desirable for a silicon substrate to be used as the optical fiber mounting substrate 1.

Optical waveguides in which an organic insulating material such as an epoxy resin, an acrylic resin, or a polyimide resin is used for the core layer and the cladding layer are permissible as the optical waveguides 4 of the optical waveguide substrate 3; however, optical waveguides in which silicon or silicon-germanium is used as the core layer and $SiO_2$ is used as the cladding layer are desirable. Typically, a buried $SiO_2$ film may be used in which a silicon-on-insulator (SOI) substrate is used, a core layer is formed by processing a single-crystal silicon layer, and a buried oxide (BOX) layer is used as a lower cladding layer.

It ought to be noted that a resin having a certain degree of mechanical strength is desirable as the resin layer 6, and an epoxy resin is used, for example. Furthermore, the transparent resin 5 may be a resin that is transparent with respect to the wavelength of the light to be guided through the optical waveguides 4, and an epoxy resin, an acrylic resin, or a silicone resin or the like is used, for example.

In the embodiment of the present technology, because the optical waveguide substrate 3 and the optical fiber mounting substrate 1 are separate components, they are each able to be formed by specific optimal processes. The front surface heights of the optical waveguide substrate 3 and the optical fiber mounting substrate 1 coincide due to the front surfaces being arranged so as to face downward and being affixed to an adhesive member such as an adhesive sheet. Therefore, if the depths of the optical fiber alignment grooves 2 are specified, the heights of the cores of the optical waveguide and the cores of the optical fibers automatically coincide. For the rest, two in-plane movement axes and one rotational axis may be controlled. These are axes that can be confirmed using a camera or the like from above and so forth, and are easy to control.

Furthermore, a method in which an optical adhesive is used on joining surfaces is generally adopted for the adhesion of optical components; however, in the embodiment of the present technology, because hardening occurs from the periphery due to the mold resin, it is possible to realize a much stronger join compared to when an optical adhesive is used. Thus, the suppression of changes that occur over time and uses and so forth in demanding temperature environments become possible.

Although such structure-regulating mold resins are often nontransparent, it is possible for both optical and structural properties to be realized by using a transparent resin for light-transmitting portions. Furthermore, such transparent resin has the effect of suppressing positional deviation between the optical waveguide substrate and the V-groove substrate when the mold resin cures, and it becomes possible to obtain an optical waveguide device having more precise positional relationships.

Example

First Thereof

Figure 3A:
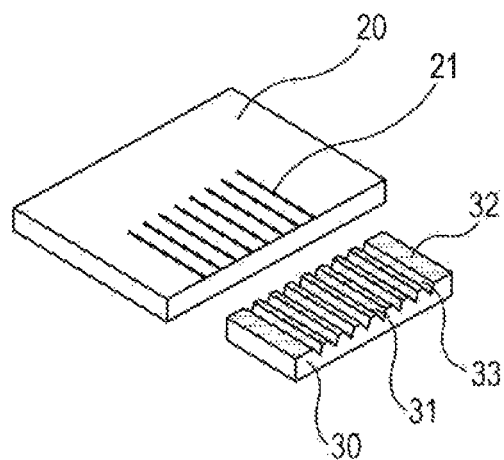
FIG. 3A is an illustrative drawing of an optical waveguide component manufacturing step (first thereof) of an example (first thereof) of the present technology.

An optical waveguide component of an example (first thereof) of the present technology is described with reference to FIG. 3A to FIG. 9B, and, to begin, a manufacturing step for the optical waveguide component is described with reference to FIG. 3A to FIG. 5B. First, as depicted in FIG. 3A, an optical waveguide substrate 20 in which optical waveguides 21 are formed and a V-groove substrate 30 in which V-grooves 31 are formed are prepared. An SOI substrate is used for the optical waveguide substrate 20, a BOX layer serves as a lower cladding layer, a single-crystal silicone layer thereon is processed to serve as a core layer, and the optical waveguides 21 are formed by covering with an $SiO_2$ layer constituting a core-layer upper cladding layer.

Meanwhile, with regard to the V-groove substrate 30, a single-crystal silicon substrate in which the main surface is the (100) plane is subjected to etching using KOH and V-grooves 31 in which the (111) planes are sidewall surfaces are formed. At such time, it is possible to precisely control the depths of the V-grooves 31 by forming the width of an etching mask in a precise manner. It ought to be noted that, as described hereafter, after the front surface of the V-groove substrate 30 in which the V-grooves 31 are formed has been covered by a thin metal film 32, only the V-grooves 31 are filled with a filling resin 33, and the front surface thereof is flattened. It is desirable for the filling resin 33 to have fluidity such that pouring into thin grooves is possible, and heat resistance sufficient to withstand molding. It is additionally desirable for the filling resin 33 to also have non-adhesive properties in order to be removed at the end; however, this is not a mandatory condition if used together with a metal film 32. An epoxy resin, a nylon resin, or a polycarbonate, polyacetal, polybutylene terephthalate, or fluorine resin or the like is desirable as the filling resin 33.

Figure 3B:
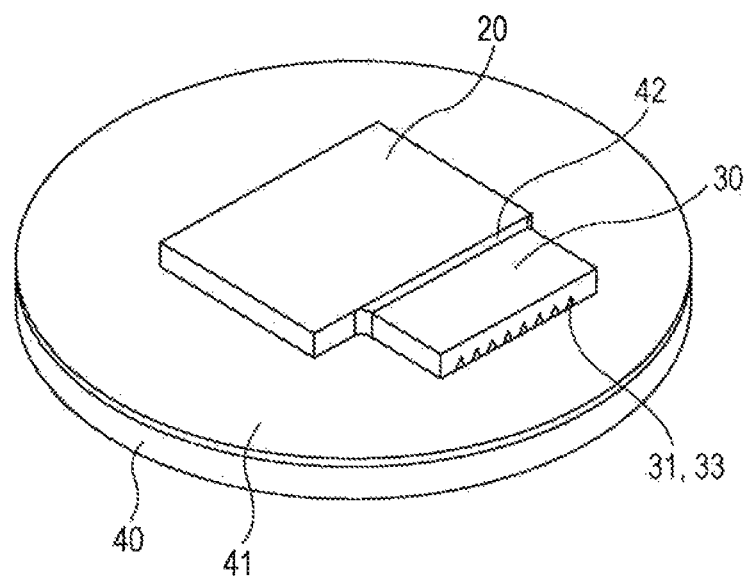
FIG. 3B is an illustrative drawing of an optical waveguide component manufacturing step (second thereof) of an example (first thereof) of the present technology.

Next, as depicted in FIG. 3B, an adhesive sheet 41 is affixed to the front surface of a stainless steel substrate 40, and the V-groove substrate 30 and the optical waveguide substrate 20 are positionally aligned in a precise manner and affixed on this adhesive sheet 41 in such a way that the V-grooves 31 side is facing downward and the optical waveguides 21 are facing downward.

It is possible to realize this positional alignment by constructing a precision flip-chip bond or mechanism similar thereto by using a precision stage. Alignment marks (not depicted) or the like formed on the optical waveguide substrate 20 and the V-groove substrate 30 are used to accurately specify positions between the two substrates and to carry out affixing to the adhesive sheet. The positions of the optical waveguides 21 and the V-grooves 31 are thereby specified.

Next, in this state, a transparent optical adhesive having a specified refractive index and transmittance is dripped between the two substrates and cured to form a transparent resin layer 42. It ought to be noted that if the optical waveguide substrate 20 is a transparent material, it is possible to induce curing by using a UV curing-type optical adhesive and irradiating with UV light. If UV light is not used, an adhesive that cures by both UV light and heat is used, and UV light is irradiated from the front surface to achieve temporary fixing, after which heat is applied to achieve complete curing. Alternatively, a thermosetting-type optical adhesive may be used. In the case of thermosetting, heat may be applied for that purpose; however, in the subsequent molding step, the type of optical adhesive may be selected to ensure that curing occurs prior to the mold resin being poured.

Figure 4A:
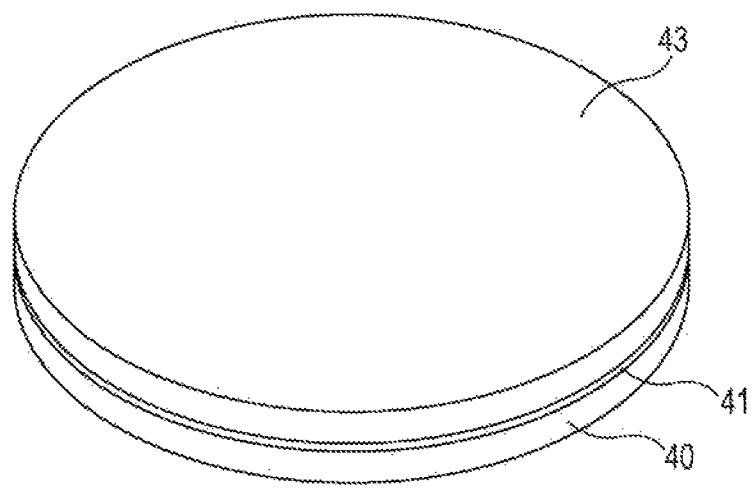
FIG. 4A is an illustrative drawing of an optical waveguide component manufacturing step (third thereof) of an example (first thereof) of the present technology.

Next, as depicted in FIG. 4A, molding is carried out with an epoxy resin 43 while the optical waveguide substrate 20 and the V-groove substrate 30 are affixed to the adhesive sheet 41, and sections other than the front surfaces of the optical waveguide substrate 20 and the V-groove substrate 30 are covered by the epoxy resin 43 and fixed. It ought to be noted that, at this time, the epoxy resin 43 does not intrude into the V-grooves 31 as the V-grooves 31 are filled with the filling resin 33.

Figure 4B:
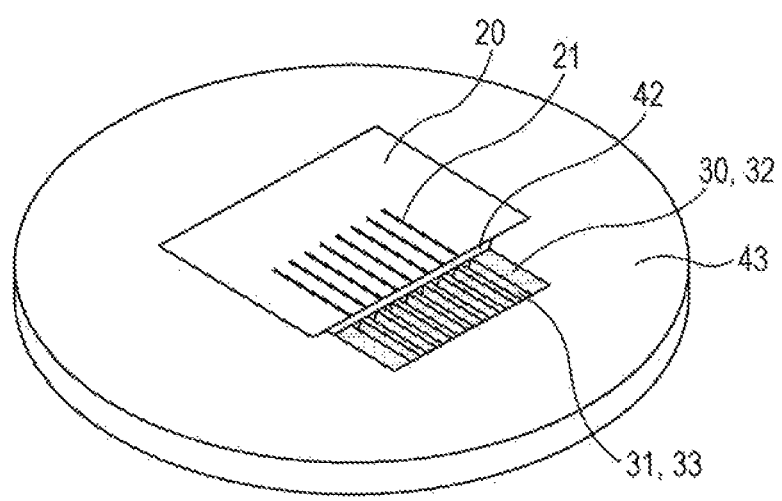
FIG. 4B is an illustrative drawing of an optical waveguide component manufacturing step (fourth thereof) of an example (first thereof) of the present technology.
Figure 5A:
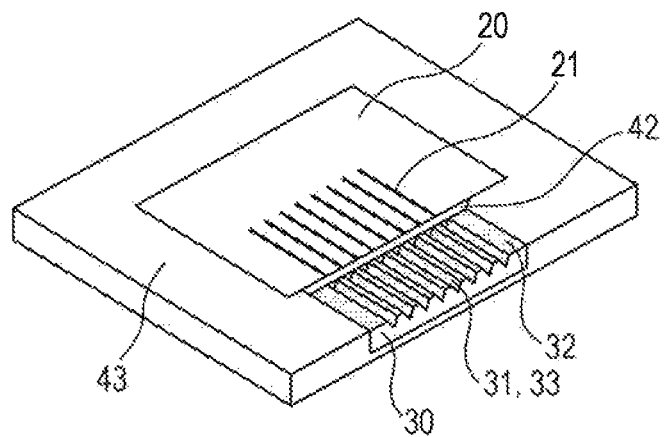
FIG. 5A is an illustrative drawing of an optical waveguide component manufacturing step (fifth thereof) of an example (first thereof) of the present technology.

Next, as depicted in FIG. 4B, the optical waveguide substrate 20 and the V-groove substrate 30 are separated from the adhesive sheet 41 while being fixed by the epoxy resin 43. Next, as depicted in FIG. 5A, the optical waveguide substrate 20 and the V-groove substrate 30 are cut into a chip shape of a predetermined size together with the epoxy resin 43, and the end surfaces of the V-grooves 31 are exposed.

Figure 5B:
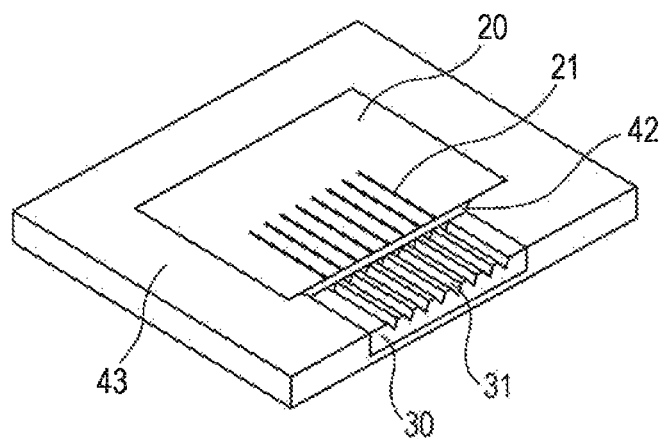
FIG. 5B is an illustrative drawing of an optical waveguide component manufacturing step (sixth thereof) of an example (first thereof) of the present technology.

Next, as depicted in FIG. 5B, the filling resin 33 filling the V-grooves 31 is removed. This can be easily realized by etching and removing the metal film 32. The basic structure of the optical waveguide component of an example (first thereof) of the present technology is thereby completed. In this case, with the thickness of the metal film 32 as the amount of offset, the optical waveguide substrate 20 and the V-groove substrate 30 are aligned in a flush state.

Figure 6:
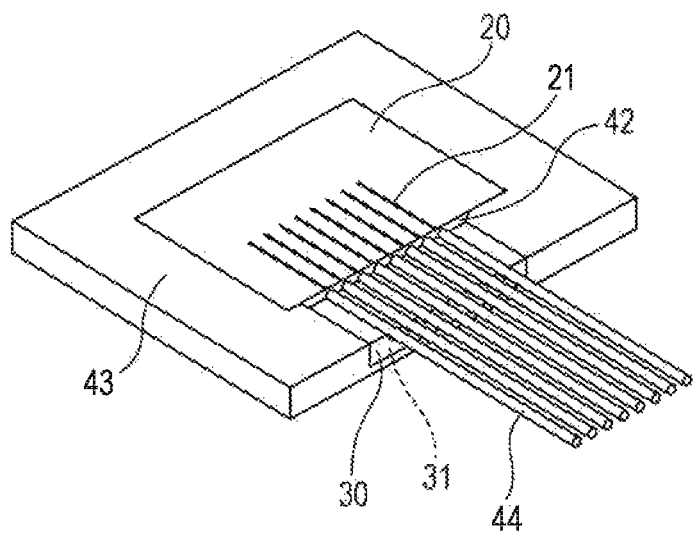
FIG. 6 is a perspective view of a state in which optical fibers are mounted in an optical waveguide component of an example (first thereof) of the present technology.

FIG. 6 is a perspective view of a state in which optical fibers are mounted in the optical waveguide component of the example (first thereof) of the present technology, where an optical adhesive is used in the V-grooves 31 of the V-groove substrate 30 to fix the optical fibers 44. At such time, because the depths of the V-grooves 31 are precisely controlled in the etching step, and the front surfaces of the V-groove substrate 30 and the optical waveguide substrate 20 have an amount of offset to be in a precise flush state, it is possible for the positional alignment of the optical waveguides 21 and the optical fibers 44 to be carried out in a precise manner.

Figure 7A:
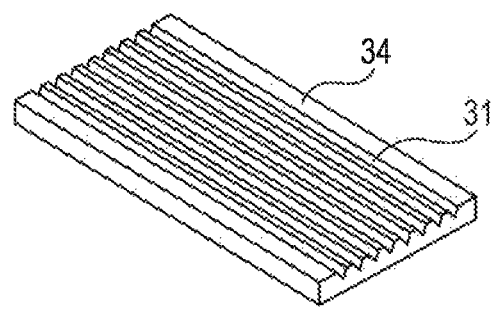
FIG. 7A is an illustrative drawing of a V-groove substrate manufacturing step (first thereof)
Figure 7B:
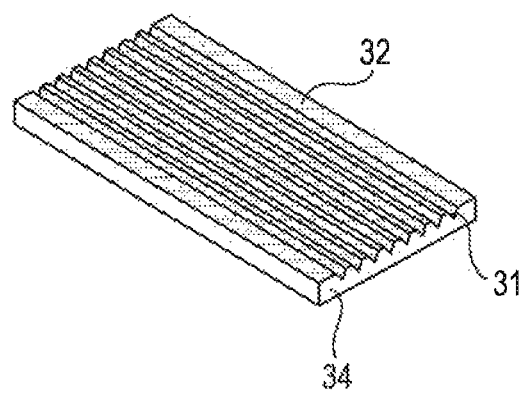
FIG. 7B is an illustrative drawing of a V-groove substrate manufacturing step (second thereof)

Next, the manufacturing step for the V-groove substrate used in the example (first thereof) of the present technology is described with reference to FIG. 7A to FIG. 9B. First, as depicted in FIG. 7A, a single-crystal silicon substrate in which the main surface is the (100) plane is subjected to etching using KOH and V-grooves 31 in which the (111) planes are sidewall surfaces are formed. At such time, the V-grooves 31 are formed to a depth that takes into account the thickness of the metal film 32 of the following step. Next, as depicted in FIG. 7B, the metal film 32 of Al, Ni, or Cu or the like is formed on the front surface of a V-groove raw substrate 34 by vapor deposition or a sputtering method or the like.

Figure 8A:
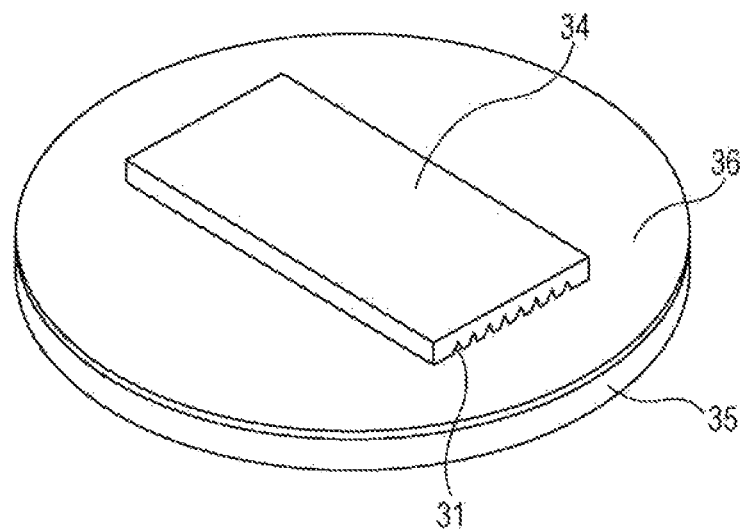
FIG. 8A is an illustrative drawing of a V-groove substrate manufacturing step (third thereof)
Figure 8B:
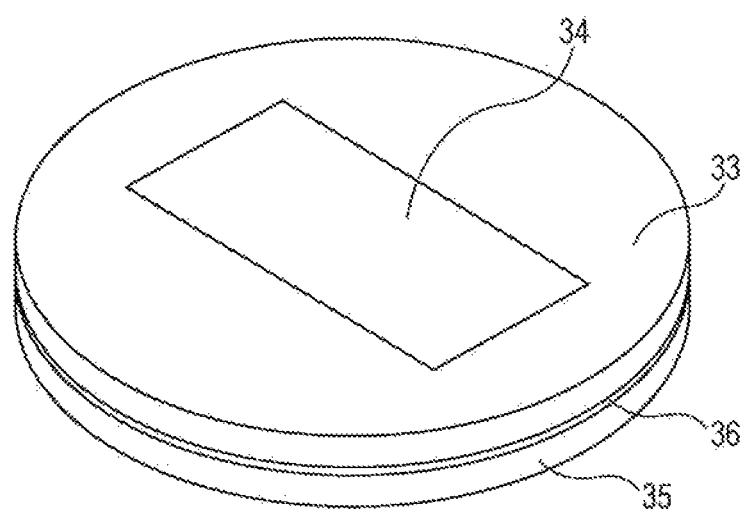
FIG. 8B is an illustrative drawing of a V-groove substrate manufacturing step (fourth thereof)

Next, as depicted in FIG. 8A, an adhesive sheet 36 is affixed to the front surface of a stainless steel substrate 35, and the V-groove raw substrate 34 is affixed on this adhesive sheet 36 in such a way that the V-grooves 31 face downward. It ought to be noted that although only one V-groove raw substrate 34 is depicted in order to simplify the illustration here, a plurality of V-groove raw substrates 34 may be processed at the same time. Next, as depicted in FIG. 8B, the filling resin 33 is poured over the entire surface. At this stage, the filling resin 33 is poured also into the V-grooves 31.

Figure 9A:
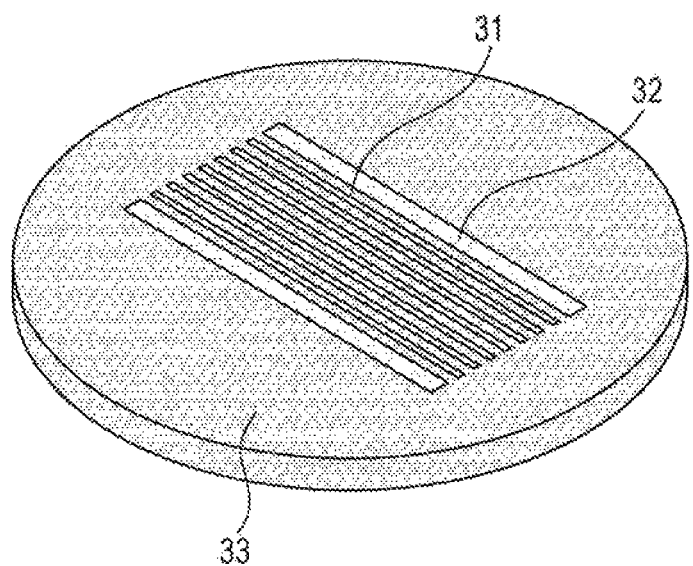
FIG. 9A is an illustrative drawing of a V-groove substrate manufacturing step (fifth thereof)
Figure 9B:
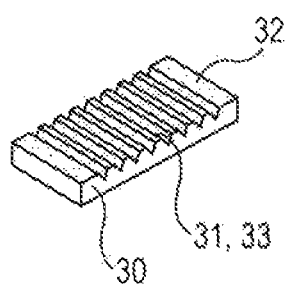
FIG. 9B is an illustrative drawing of a V-groove substrate manufacturing step (sixth thereof)

Next, as depicted in FIG. 9A, the V-groove raw substrate 34 is removed from the adhesive sheet 36 while being covered by the filling resin 33. Due to the V-groove raw substrate 34 being affixed to the adhesive sheet 36, it is possible for the filling resin 33 to be filled in a flat state. Next, as depicted in FIG. 9B, by cutting the V-groove raw substrate 34 to a predetermined size, the V-groove substrate 30 that is to be combined with the optical waveguide substrate 20 is formed. It ought to be noted that in order to ensure adhesive force with the mold resin, it is desirable for the filling resin 33 to not remain on the rear surface of the V-groove raw substrate 34. If it is not possible to avoid the filling resin 33 flowing onto the rear surface when the filling resin 33 is poured, this is removed prior to the states depicted in FIG. 3. For example, the rear surface is cut in the state depicted in FIG. 9A. Alternatively, the filling resin 33 on the rear surface is separated in the state depicted in FIG. 9B.

In this way, in the example (first thereof) of the present technology, because the V-grooves 31 are filled with the filling resin 33 while being in a flat state, in the step in which molding is carried out with mold resin, the mold resin does not intrude into the V-grooves 31. It ought to be noted that, in the description of this example, it is not mandatory for the metal film 32 to be formed on the front surface of the V-groove substrate 30, and the V-grooves 31 may be directly filled with the filling resin 33.

Example

Second Thereof

Figure 10A:
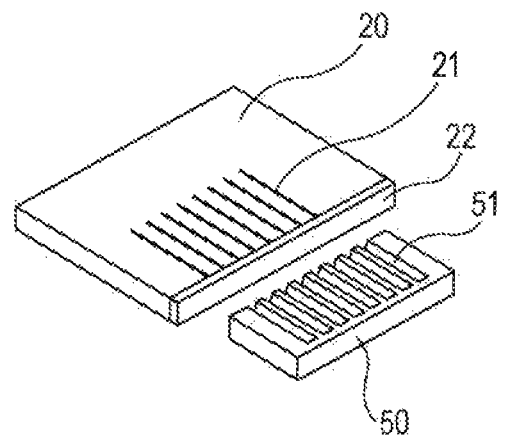
FIG. 10A is an illustrative drawing of an optical waveguide component manufacturing step (first thereof) of an example (second thereof) of the present technology.

Next, a manufacturing step for an optical waveguide component of an example (second thereof) of the present technology is described with reference to FIG. 10A to FIG. 12. First, as depicted in FIG. 10A, the optical waveguide substrate 20 and a V-groove mother substrate 50 are prepared separately. The optical waveguide substrate 20 may be exactly the same as the aforementioned example (first thereof). However, in the V-groove mother substrate 50, although a silicon substrate in which the (100) plane is the main surface is subjected to etching using KOH to form V-grooves 51, one end side of the V-grooves 51 is covered by a mask, and the V-grooves 51 are formed so as to not reach the end section of the silicon substrate.

At such time, a transparent resin layer 22 is provided in advance on the surface of the optical waveguide substrate 20 that is to connect with the V-groove mother substrate 50. A resin that has adhesiveness or elasticity is desirable as this transparent resin layer 22, and, for example, a silicone resin is selected.

Figure 10B:
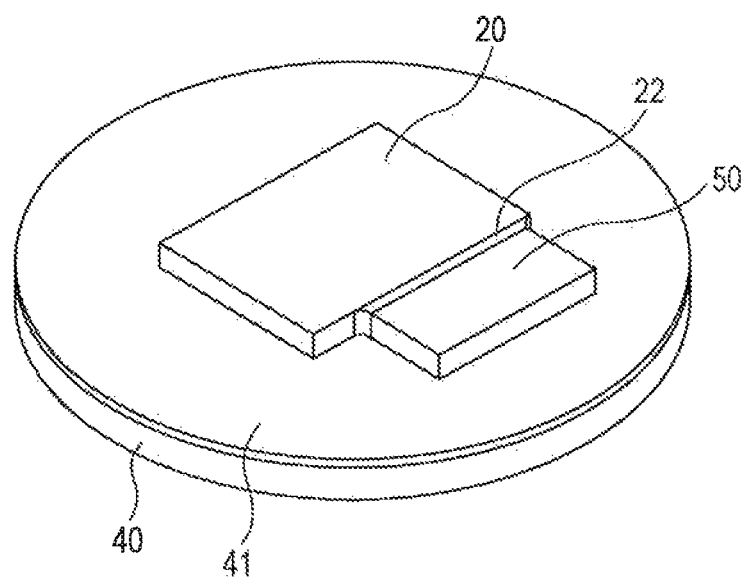
FIG. 10B is an illustrative drawing of an optical waveguide component manufacturing step (second thereof) of an example (second thereof) of the present technology.

Next, as depicted in FIG. 10B, in the same manner as in the aforementioned example (first thereof), an adhesive sheet 41 is affixed to the front surface of a stainless steel substrate 40, and the V-groove mother substrate 50 and the optical waveguide substrate 20 are positionally aligned in a precise manner on this adhesive sheet 41 in such a way that the V-grooves 51 side is facing downward and the optical waveguides 21 are facing downward, and the V-groove mother substrate 50 and the optical waveguide substrate 20 are affixed while in contact with the transparent resin layer 22.

Figure 11A:
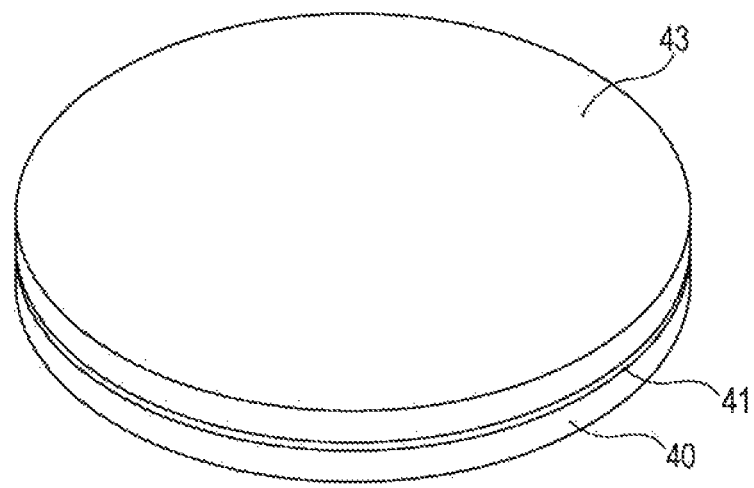
FIG. 11A is an illustrative drawing of an optical waveguide component manufacturing step (third thereof) of an example (second thereof) of the present technology.

Next, as depicted in FIG. 11A, molding is carried out with the epoxy resin 43 while the optical waveguide substrate 20 and the V-groove mother substrate 50 are affixed to the adhesive sheet 41, and sections other than the front surfaces of the optical waveguide substrate 20 and the V-groove mother substrate 50 are covered by the epoxy resin 43 and fixed. It ought to be noted that, at such time, the epoxy resin 43 does not intrude into the V-grooves 51 as one end of the V-grooves 51 is in a closed state and the other end is in contact with the transparent resin layer 22.

Figure 11B:
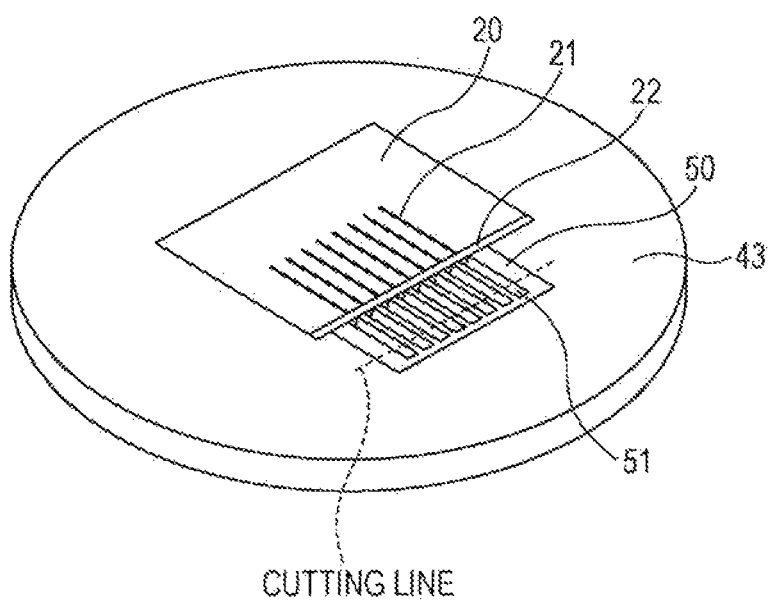
FIG. 11B is an illustrative drawing of an optical waveguide component manufacturing step (fourth thereof) of an example (second thereof) of the present technology.
Figure 12:
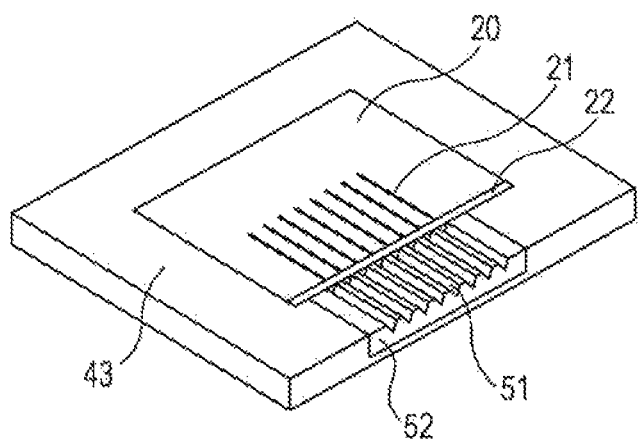
FIG. 12 is an illustrative drawing of an optical waveguide component manufacturing step (fifth thereof) of an example (second thereof) of the present technology.

Next, as depicted in FIG. 11B, the optical waveguide substrate 20 and the V-groove mother substrate 50 are separated from the adhesive sheet 41 while being fixed by the epoxy resin 43. Next, as depicted in FIG. 12, the optical waveguide substrate 20 and the V-groove mother substrate 50 are cut into a chip shape of a predetermined size together with the epoxy resin 43, and the end surfaces of the V-grooves 51 are exposed, and a V-groove substrate 52 on which optical fibers can be mounted is thereby formed.

In this example (second thereof) of the present technology, a V-groove mother substrate in which one end of the V-grooves is closed is used, and the other end of the V-grooves is in contact with a transparent resin layer that has adhesiveness or elasticity, and therefore a step in which the V-grooves are filled with a resin in advance does not have to be employed, and, consequently, a filling resin removal step also does not have to be employed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical waveguide component, comprising:
    an optical fiber mounting substrate provided with optical fiber alignment grooves having either, for alignment of optical fibers, V-grooves or inverted trapezoidal grooves in which inverted top sections of the V-grooves are truncated;
    an optical waveguide substrate in which optical waveguides are formed;
    a resin layer that is aligned and fixed in a state in which the optical fiber mounting substrate and the optical waveguide substrate are flush or have a predetermined amount of offset for optically coupling the optical waveguides and the optical fibers; and
    a transparent resin that is filled in a gap in which the optical fiber mounting substrate and the optical waveguide substrate face each other.

2. The optical waveguide component according to claim 1, wherein the optical fiber mounting substrate comprises a silicon substrate.

3. The optical waveguide component according to claim 1, wherein a core layer of the optical waveguides of the optical waveguide substrate comprises silicon or silicon-germanium, and a cladding layer of the optical waveguides comprises $SiO_2$.

4. The optical waveguide component according to claim 3, wherein the optical waveguide substrate comprises an SOI substrate in which a single-crystal silicon layer is provided on a single-crystal silicon substrate with a buried $SiO_2$ film therebetween, the core layer of the optical waveguides is a core layer formed by processing the single-crystal silicon layer, and a lower cladding layer comprises the buried $SiO_2$ film.

5. An optical waveguide device, comprising:
    the optical waveguide component according to claim 1; and
    the optical fibers that are fixed in the optical fiber alignment grooves of the optical waveguide component.

* * * * *